(12) United States Patent
Gray

(10) Patent No.: US 8,551,225 B2
(45) Date of Patent: Oct. 8, 2013

(54) GAS-LIQUID-SOLID SEPARATOR

(76) Inventor: Ian Gray, Coorparoo (AU)

( * ) Notice: Subject to any disclaimer, the term of this patent is extended or adjusted under 35 U.S.C. 154(b) by 167 days.

(21) Appl. No.: 13/138,838

(22) PCT Filed: Apr. 6, 2010

(86) PCT No.: PCT/AU2010/000386
§ 371 (c)(1),
(2), (4) Date: Oct. 5, 2011

(87) PCT Pub. No.: WO2010/115234
PCT Pub. Date: Oct. 14, 2010

(65) Prior Publication Data
US 2012/0024151 A1    Feb. 2, 2012

(30) Foreign Application Priority Data

Apr. 6, 2009 (AU) ................. 2009901460
Nov. 23, 2009 (AU) ................. 2009905709

(51) Int. Cl.
*B01D 45/12* (2006.01)

(52) U.S. Cl.
USPC ........ 95/271; 95/24; 55/417; 55/428; 55/430; 55/431; 55/447; 55/459.1; 55/423; 55/466; 55/300; 55/295; 96/171; 96/408; 96/409; 96/405; 96/406

(58) Field of Classification Search
USPC ........ 55/417, 428, 430, 431, 432, 447, 459.1, 55/423, 466, 300, 295; 95/271, 24; 96/171, 408, 409, 405, 406
See application file for complete search history.

(56) References Cited

U.S. PATENT DOCUMENTS

| | | | |
|---|---|---|---|
| 3,151,961 A * | 10/1964 | Blackmore et al. | 96/210 |
| 3,784,009 A | 1/1974 | Maciula | |
| 4,940,473 A | 7/1990 | Benham | |
| 6,860,921 B2 * | 3/2005 | Hopper | 95/261 |
| 2003/0150330 A1 | 8/2003 | Hotta et al. | |
| 2004/0197622 A1 | 10/2004 | Wheat et al. | |

FOREIGN PATENT DOCUMENTS

| | | |
|---|---|---|
| EP | 0475338 | 12/1994 |
| GB | 1227128 | 4/2005 |
| JP | 2005-000865 | 1/2005 |

* cited by examiner

*Primary Examiner* — Jason M Greene
*Assistant Examiner* — Dung H Bui
(74) *Attorney, Agent, or Firm* — Roger N. Chauza, PC

(57) ABSTRACT

The invention is a separator designed to separate an incoming stream of liquid, gas, and some particulate matter into a separate gas stream, and a separate liquid stream containing the particulate matter. This is achieved through cyclonic action and the use of a float to operate internal valves within the cyclone. The float is mounted on a shaft which is rotated by the motion of the incoming fluid stream and this motion is used to agitate the solids in the liquid so as to prevent the outlet port from becoming jammed. The outlet port also has an auger contained therein that removes particulate matter.

29 Claims, 4 Drawing Sheets

GAS-LIQUID-SOLID SEPARATOR

RELATED PATENT APPLICATIONS

This patent develops the concepts presented in the Australian provisional application 'Gas-liquids-solids separator' 2009901460 lodged on 6 Apr. 2009 and Australian provisional application 'Gas Liquid and Solids Separator' 2009905709 filed on 23 Nov. 2009.

TECHNICAL FIELD OF THE INVENTION

This patent relates to the separation of a mixed gaseous and liquid stream with particulate matter included. It has particular use in the field of separation of gas from liquids being pumped out of a well which also contains some solid particulate matter.

BACKGROUND OF THE INVENTION

There are many instances where it is necessary to separate a gas from a liquid that may also contain particles, while maintaining pressure in a separator. One such example is the case of a well that is producing gases, liquids and particles. This is typical of wells that are producing gas from coal seams. Here there are frequently two streams coming from the well. One is from the well pump, which is producing water containing gas and coal fines. The other comes from the annulus and is mostly comprised of gas mixed with some water and occasionally some particles.

Most wells now have fitted to them separators that are essentially pressure vessels with a gas outlet at the top, and a valve to let out liquids in the bottom that is opened by various means. The separation is essentially brought about by stilling the liquid in the separator and letting gravity do the separation. One of the disadvantages of such a separator is that solids may consolidate in the bottom and block the release of the liquid. In addition the efficiency of the separator is limited by gravitational forces.

Cyclonic separators have been in use for a long time. They operate by having the inlet fluid enter a tubular separator tangentially. The swirling motion induces a radial acceleration which acts on the fluid causing more dense materials to be forced near the wall of the cyclone where they slow and are pulled down by gravitational force to the cyclone base where they are discharged. Such cyclones are typically used in the separation of particulate ores from liquids. In this application they are generally referred to as hydrocyclones. The discharge from the top in these cases is a less dense media, along with a dense media from the bottom of the hydrocyclones. Cyclonic devices are also used to clean particulate matter from air such as in internal combustion engine air cleaners and domestic vacuum cleaners.

The outlet point of all of these devices involves discharge to the external pressure of a combination of fluids and particles.

SUMMARY OF THE INVENTION

This invention permits the continuous separation of liquids from gases without gas loss into the liquid stream. The device also enables particulate matter to be removed with the liquid stream.

The invention uses a form of cyclone which is used to separate a liquid from a gas stream that may contain particulate matter. The form of the invention is essentially that of a cyclonic separator in which the gas, water and particles enter tangentially and swirl around the internal circumference of the separator. The liquid and any particulate matter is forced to the outside and the gas which is less dense accumulates in the centre of the cyclone. Through gravitational effects the liquid slides down to the base of the separator while the gas rises and passes out of an outlet at the top. The liquid and the particles it contains accumulate in the bottom of the separator and start to fill it. When they have reached an adequate level they lift a float which is contained in the cyclone separator and cause it to open a valve at the bottom of the device. Under these conditions the separator discharges the liquid and any fine particles it may contain from its base. The gas separated from the liquids and solids forms a core and flows out through a port in the top of the cyclone. This gas outlet port may also use a float operated valve that closes it if the fluid level in the cyclone gets too high thus preventing liquid from being discharged into the gas port.

In its preferred embodiment the float is attached concentrically to a shaft that is centrally located on the axis of the cyclone by bearings that permit it to rotate and slide up and down. When the float is seated at the bottom, a seal at the bottom of the shaft prevents fluid loss from the bottom valve. When the liquid level rises, the float rises, permitting liquid and solids to flow out of the bottom of the device. If the float rises too high a seal on the top of the shaft closes the gas outlet port.

In the event that there is a low liquid content compared to gas, but there is a significant proportion of solids in the liquid, there is a need to agitate the liquid at the bottom of the cyclonic separator so that it does not block. In this embodiment of the invention the rotational motion of the swirling inlet fluid is used to rotate the shaft and a system to clear the base of the cyclone. In its preferred embodiment this system to clear the base of the cyclone comprises an auger system in the outlet to screw solids out of the outlet port and also included agitators in the form of flexible elements such as wires to stir up the liquid and solids in the base of the separator. An alternative embodiment is the replacement or combination of this system with a design which is enlarged at its base, so as to lift solids in the base of the separator and break them up with the upward movement of the float.

The device is designed to operate as a continuous separator for gas, liquid and solids entering tangentially towards the top of the cyclone, with gas being emitted from the top, and liquids containing solids being discharged from the bottom of the cyclone. In the event of no liquid flow the bottom outlet port is sealed, while in the event of excessive or just liquid flow—with or without solids—the upper port is sealed thus preventing liquid flowing out of the gas outlet.

DETAILED DESCRIPTION OF THE DRAWINGS

Figure 1:
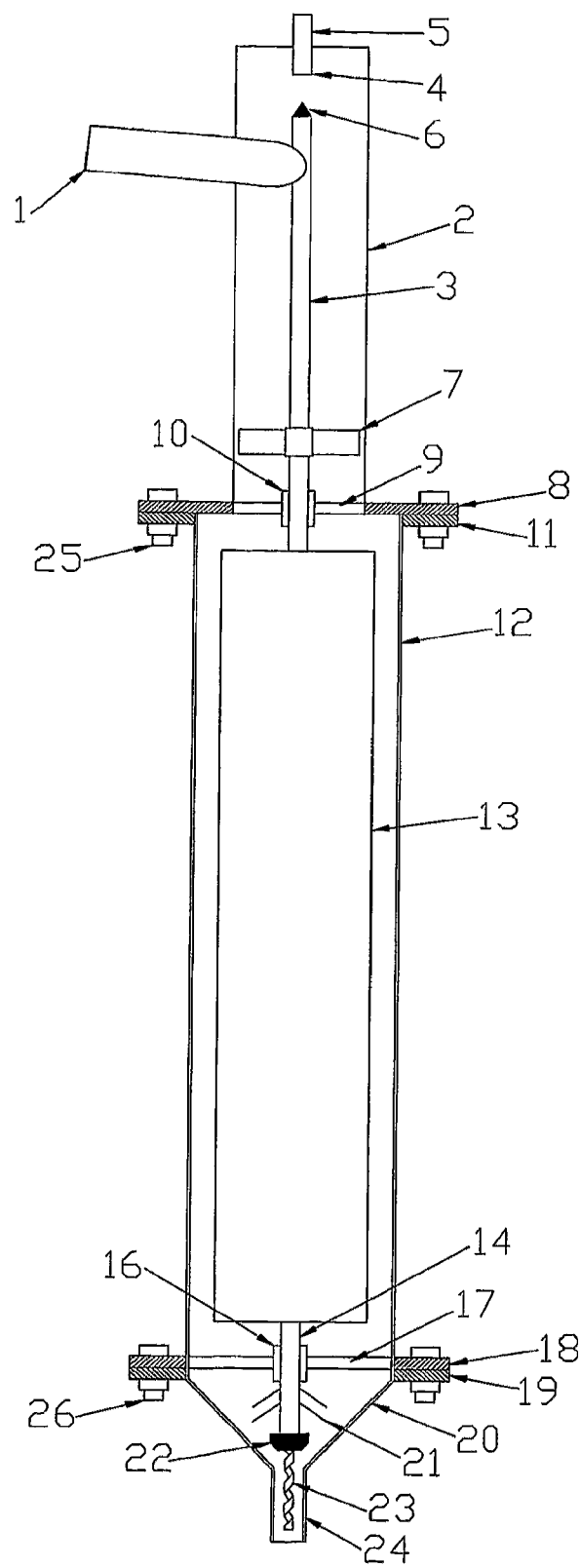
FIG. 1 is a vertical section of the separator.

FIG. 1 shows a vertical section of a separator. The inlet conduit (1) carries a mixed stream of gas, liquid and particulate matter into the cyclone chamber (2). At the top of the chamber is an outlet conduit (5) which is designed to discharge gas from the separator. Liquid from the separator, which may contain solid particulate matter, swirls around the inside of the cyclone chamber (2) leaving a central gaseous core from which gas can flow up and out of the port (4) of outlet conduit (5). The liquid and any solids it may contain swirl downwards and impinge on the turbine blades (7) mounted on a shaft (3), thus causing the shaft (3) to rotate. In this embodiment the float (13) forms part of the shaft (3) and below the float (13) we have the shaft extension (14) which carries the agitators (21) (shown in the figure as being made of a flexible wire or rods), the seal (22) and an auger (23). The shaft (3) and float assembly (13) are aligned by bearings (10) and (16) which permit rotation and sliding. The upper bearing (10) is supported by a spider (9) which is shown as an extension of the upper flange (8). The lower bearing (16) is supported in spider (17) which is shown as an extension of flange (18). Upper flange (8) is shown bolted (25) to lower flange (11) which is connected (usually by welding) to the float housing (12). Flange (18) is also connected to the float housing (12) and is shown bolted (26) to the lower cone (20) of the separator. This lower cone (20) is in turn connected to the liquid and solids outlet conduit (24) of the separator.

In operation, gas, liquid, and solids enter the cyclone through port (1) which is deliberately shown as being angled slightly downwards to provide some initial downwards velocity to the entering fluid. The gas separates out and flows through the port (4) and out of the conduit (5). The swirling liquid causes the turbine (7) to rotate and drive the shaft (3), float (13) and shaft extension (14). The agitators (21) also rotate within the cone (20) stirring up particulate matter in the liquid therein. At the base of the shaft (3) is a cleaner (23) which in this embodiment is an auger (23) to clear the outlet conduit (24) for liquids and solids. When there is inadequate liquid in the separator the bottom seal (22) seals against the base of the cone (20) preventing gas loss. When there is adequate liquid in the separator, the float (13) rises, lifting the seal (22) from the cone (20) and permitting liquid and particulate matter outflow from the conduit (24). In its preferred form either the seal (22) or the base of the cone (20) are an elastomer so as to ensure a tight seal between the two. The rotary action of the shaft extension (14) and with it the agitators (21) and the auger (23) ensure that solids do not consolidate and block the outlet (24). In the event that no gas is contained in the fluid stream entering the inlet port (1), or that excessive liquid is flowing, the float rises and the seal (6) closes on port (4) thus preventing flow from it. This feature prevents liquid loss out of the top port (4).

Figure 2:
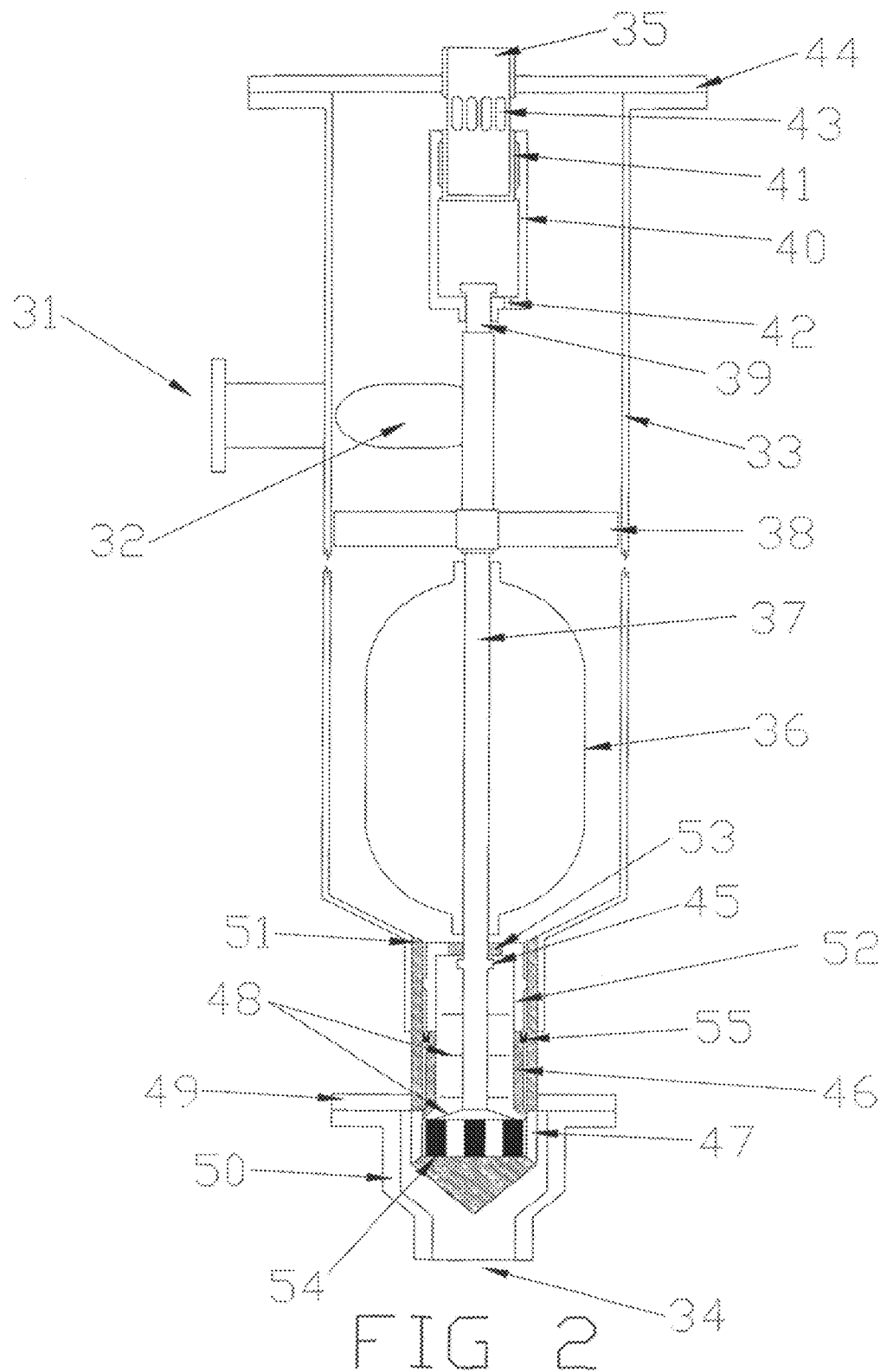
FIG. 2 is a vertical section of an alternative form of the separator.

FIG. 2 shows a vertical section of another embodiment of the separator. The inlet conduit (31) carries a mixed stream of gas, liquid and particulate matter into the cyclone via the tangential port (32) in the cyclone body (33). At the top of the separator is a port (35) that discharges gas while at the bottom of the separator is port (34) that discharges liquid with any contained solids. Within the cyclone is a float (36) that is lifted by fluid contained within the body (33). The shaft (37) passes through the float (36) and in this embodiment the shaft may rotate independently of the float. Blades (38) are attached to the shaft (37) and are designed to be rotated by the cyclonic motion of the incoming fluids. The purpose of generating a rotation in the shaft (37) is to rotate cleaning elements (48) within the outlet valve and port (34). In the drawing these elements (48) are shown as flexible wires.

In this embodiment of the invention the top and bottom valves are sleeve valves so as to minimise the effects of differential pressures across them. The lower sleeve valve consists of an outer sleeve (51) which is connected to the cyclone body (33) and to the flange (49). This sleeve has lower ports in it (47). Within the fixed outer sleeve is a movable inner sleeve (46). This inner sleeve (46) is circumferentially reduced in section over the zone marked (52) so as to let fluids and solid particles pass into the zone inside it. A bush (53) exists at the top of the inner sleeve (46, 52) against which the base of the float (36) and the locating collar (45) on the shaft (37) bear. The inner sleeve (46) is shown in this embodiment carrying an optional elastomeric seal (55) which seals against the outer sleeve (51) throughout the sliding motion of inner sleeve (46) in the outer sleeve (51). The inner sleeve (46) is shown with a circular chisel shaped end which is designed to seal against the face of the base cone (54) which is attached to the outer sleeve (51). The use of the chisel shaped end is to permit sealing at essentially the same diameter as the outside of the elastomeric seal (55) thus minimising the effects of differential pressure acting on the inner sleeve (46) and tending to displace it. Attached to the flange (49) is the outer annular element (50) which contains the outlet port (34).

The top of the cyclone body (33) is shown sealed by a flange (44) through which passes the upper valve inner sleeve (41) which contains the outlet port (35). The inner valve sleeve (41) is sealed at the base and contains radial ports (43) near the top which are designed to permit gas to enter the valve (41). An outer valve sleeve (40) surrounds the inner sleeve (41) so as to open and close the ports (43) by its vertical motion. The location of the outer sleeve (40) is determined by the liquid level in the cyclone (33) which acts on the float (36) and raises and lowers the shaft (37) which is connected to the outer sleeve (40) by the connector (39). The base of the outer sleeve (40) contains a port (42) to balance its internal pressure with that within the cyclone (33).

The operation is thus that the cyclone is initially empty and so the float (36) is at the base of its travel and the lower valve inner sleeve (46) is fully down sealing the bottom valve (46) to stop outflow. The upper valve outer sleeve (40) is fully down and the upper valve (40) is open. Gas, liquid and particulate matter enters the cyclone conduit (31) and port (32). The very high density difference between the gas, liquids and solids means that the latter two are separated by centrifugal force against the inner wall of the cyclone body (33). The presence of a liquid holds the solid particles within it thus preventing them from being blown out of the upper valve (40). The extreme density difference between the gas and liquid also means that the precise conical design required of many cyclonic separators to separate solids and the liquids carrying them which have very little density difference is not necessary. The cyclonic action turns the blades (38) thus rotating the shaft (37) which also turns the agitator wires (48) so as to prevent solids build up in the lower valve (46). As the fluid level rises, the float (36) rises lifting the lower valve inner sleeve (46) so that fluid and particles may pass through the ports (47) in it and out through the port (34). As the cyclone body (33) fills with water the float (36) rises sufficiently to raise the outer valve sleeve (40), closing off the ports (43) and preventing fluid from escaping into the gas line (not shown). In this state the cyclone (33) purges fluid out of the bottom valve (34) which is fully open.

Figure 3:
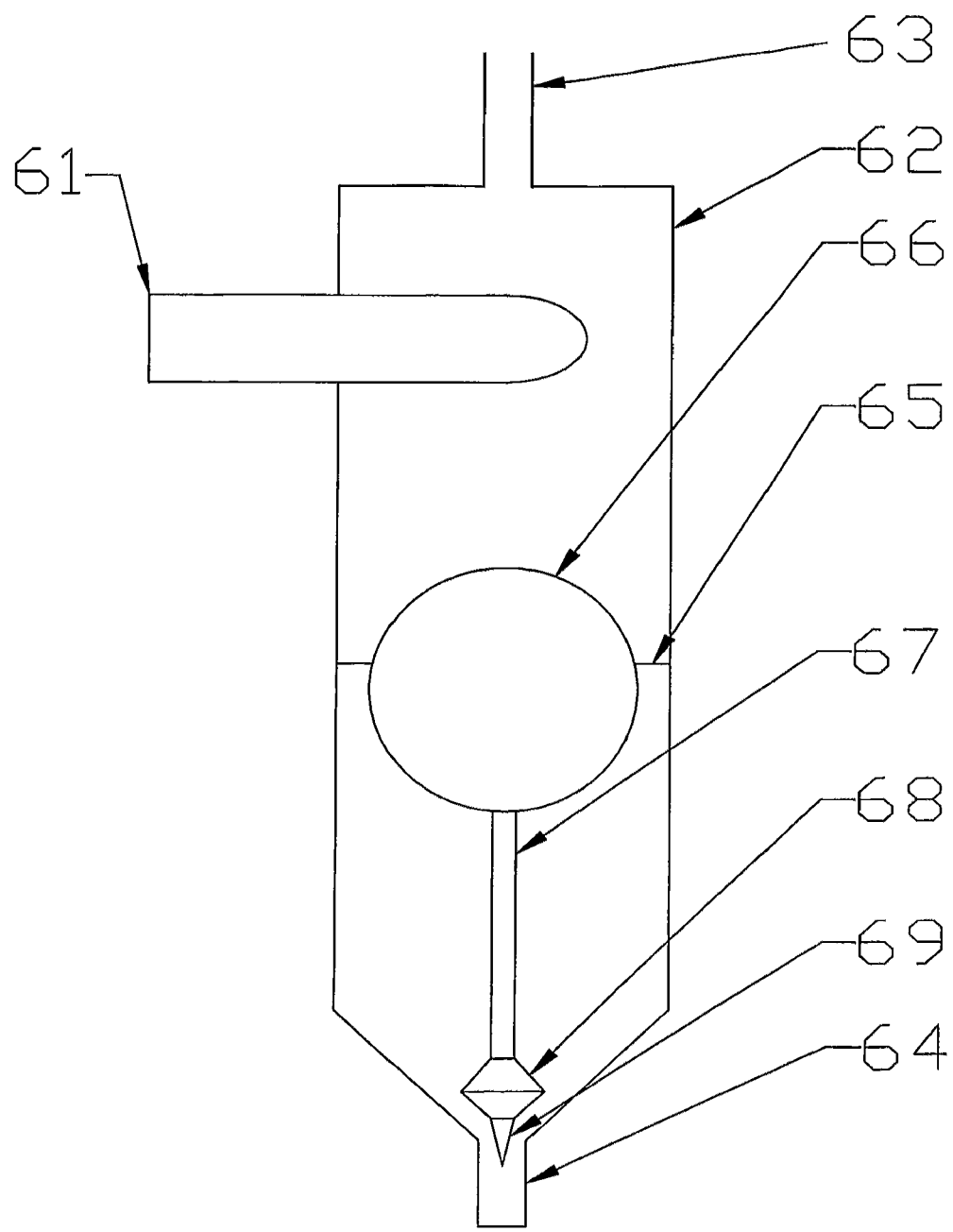
FIG. 3 shows a fluid stream flowing into an inlet conduit.

FIG. 3 shows a fluid stream flowing into the inlet conduit (61) and into the body of the cyclone (62) at a tangent so as to induce a swirling motion to the fluid. The liquid and particulate matter travel to the inside wall of the cyclone body (62), and then descend within the cyclone (62) toward the base. Before reaching the base they reach a fluid level (65) which is controlled by a liquid outlet system to stay at a relatively constant level. The liquid outlet system comprises an outlet port (64) in the base of the cyclone (62) in which a valve control element (69), shown here as a tapered element, rises and falls. The control element (69) is attached to a weight (68) which hangs below a float (66) connected thereto by shaft (67). As more liquids gather in the base of the cyclone the float (66) rises and lifts the control element (69) out of the outlet port (64) thus letting fluid and contained solids escape through the outlet port (64). As the fluid level (65) lowers so does the float (66), shaft (67), weight (68) and control element (69), thus reducing the flow rate of the fluid escaping from the outlet port (64). While the liquid descends, the gas rises within the cyclone (62) and escapes via the gas outlet port (63).

Figure 4:
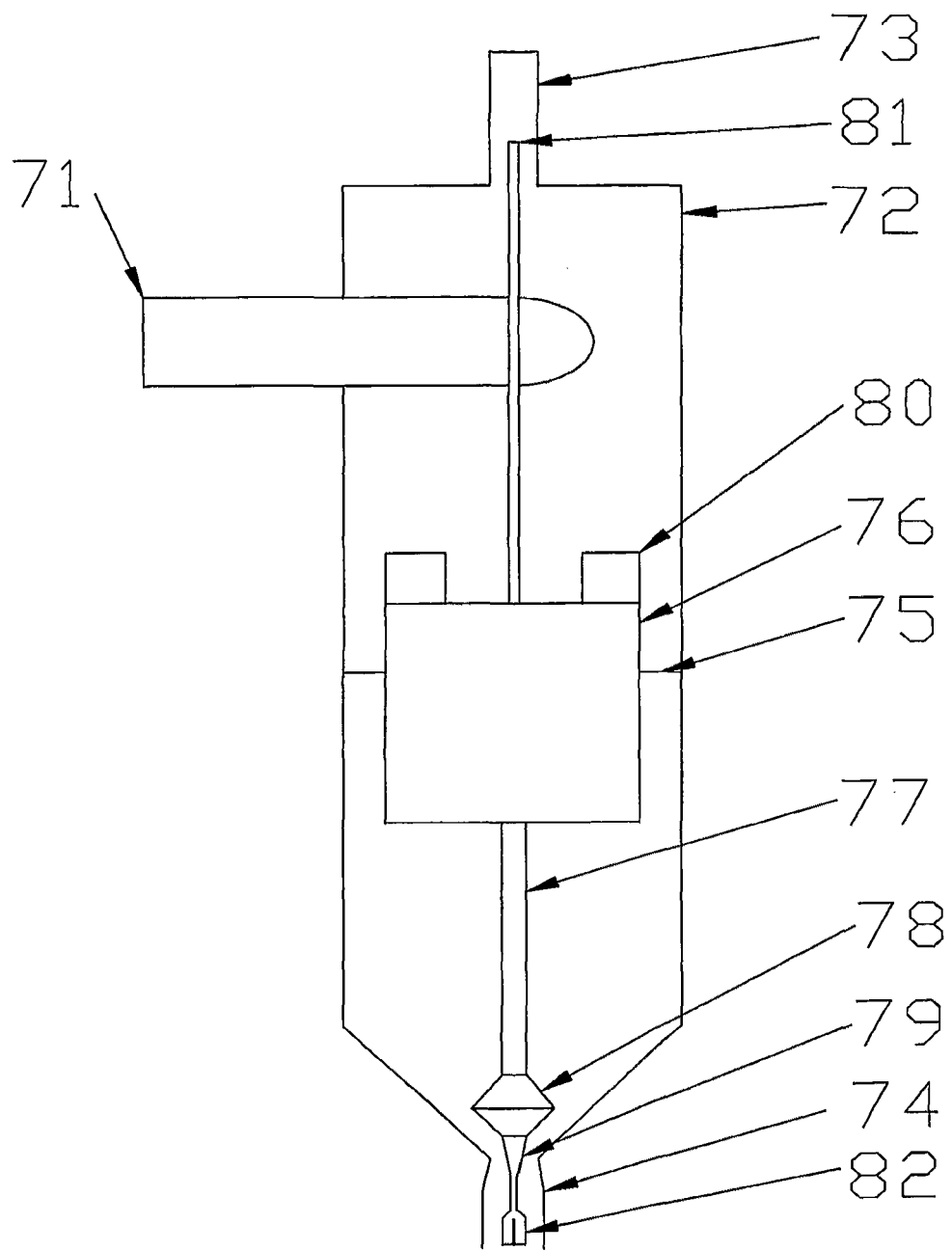
FIG. 4 is a variant of the system shown in FIG. 3.

FIG. 4 is a variant of the system shown in FIG. 3. It comprises a fluid inlet conduit (71) which carries fluids into the cyclone body (72) and has a liquid and solid outlet port (74) at the base, and a gas outlet port (73) at the top. The float (76), shaft (77) and weight (78) are the same as in FIG. 3, however the control element (79) is different, comprising in this embodiment a taper with an extension through the outlet port (74) which expands into an enlarged and fluted section (82). The float (76) is shown in this embodiment as being cylindrical, a form that could be used generally. It is fitted with vanes (80) and a stabilising shaft (81). In the event that the base of the cyclone (74) should become blocked with solids, the fluid level (75) rises until the vanes (80) on the top of the float (76) will be rotated by the fluid stream from the inlet port (71), causing the entire control mechanism to rise and the fluted section (82) to rise through the outlet port (74) and to drill out any consolidated solids. It should be noted that in this embodiment the outlet port (74) has a reverse taper to guide the fluted section (82) and to ease the passage of solids through it.

The invention claimed is:

1. A cyclone separator for separating liquids from gasses, comprising:
   a body of the cyclone separator;
   an inlet formed in the body of said cyclone separator to supply gaseous liquids into said cyclone separator;
   a gas outlet located in an upper portion of said body to allow exit of gasses from said cyclone separator;
   a liquid outlet located in a bottom portion of said body;
   a float assembly located within the body of said cyclone separator, said float assembly including:
      a) a float adapted for floating on liquid in said body, and
      b) a liquid valve attached to said float and adapted to close the liquid outlet when a level of the liquid is at a predetermined low level, and to open the liquid outlet when the level of the liquid is higher than said predetermined low level to thereby allow liquid to exit the body of said cyclone separator;
   a gas valve responsive to movements of said float for controlling the passage of gas through said gas outlet in response to the fluid level in the body of said cyclone separator; and
   whereby gasses are dynamically separated from liquids in said cyclone separator.

2. The cyclone separator of claim 1, further including a particle dislodger attached to said liquid valve for dislodging particulate matter accumulated in the liquid outlet of the body of said cyclone separator.

3. The cyclone separator of claim 2, wherein said particle dislodger comprises a piercing spike adapted for up/down movement with said float to dislodge particulate matter accumulated in the liquid outlet.

4. The cyclone separator of claim 2, wherein said dislodger comprises a fluted member which, when rotated, dislodges particulate matter accumulated in the liquid outlet.

5. The cyclone separator of claim 2, wherein said dislodger comprises an auger which, when rotated, dislodges particulate matter accumulated in the liquid outlet.

6. The cyclone separator of claim 2, further including one or more vanes located in a swirling path of liquids circulating in said cyclone separator, said one or more vanes adapted for rotating said particle dislodger.

7. The cyclone separator of claim 2, wherein said liquid outlet includes a depending outlet conduit in which said particle dislodger is located.

8. The cyclone separator of claim 1, wherein said gas valve is attached to said float so that when said float rises beyond a predetermined level, said gas valve closes said gas outlet.

9. The cyclone separator of claim 1, further including a ballast weight attached to said float assembly to stabilize said float assembly in liquid swirling in the body of said cyclone separator.

10. The cyclone separator of claim 2, further including a shaft attached to said float, and said particle dislodger is attached to a bottom portion of said shaft.

11. The cyclone separator of claim 10, wherein said gas valve is attached to a top portion of said shaft so that when said float rises beyond a predetermined level, said gas valve closes said gas outlet.

12. The cyclone separator of claim 10, further including a top bearing and a bottom bearing for supporting said shaft axially in the body of said cyclone separator.

13. The cyclone separator of claim 11, further including one or more vanes attached to said shaft, said one or more vanes located in a swirling path of liquids circulating in said cyclone separator to thereby impart a rotary motion to said particle dislodger, whereby said particle dislodger is adapted to move up and down in response to up and down movement of said float, and said particle dislodger is adapted to move in a rotary manner in response to rotary movements of said shaft.

14. The cyclone separator of claim 1, further including an agitator rotatable with said float assembly for agitating liquids in the bottom portion of said body.

15. The cyclone separator of claim 14, wherein said agitator comprises plural wires or rods.

16. The cyclone separator of claim 1, wherein said inlet comprises a conduit attached to a top portion of said body, said conduit angled downwardly toward said body to facilitate a downwards velocity of liquids entering said cyclone separator.

17. A cyclone separator for separating liquids from gasses, comprising:
   a body of the cyclone separator;
   an inlet formed in the body of said cyclone separator to supply gaseous liquids into said cyclone separator;
   a gas outlet located in an upper portion of said body to allow exit of gasses from said cyclone separator;
   a liquid outlet located in a bottom portion of said body, said gas outlet and said liquid outlet axially aligned at opposite ends of said body;
   a float assembly located within the body of said cyclone separator, said float assembly including:
      a) a float adapted for floating on liquid in said body;
      b) a shaft attached to said float;
      c) said shaft having a top end with a gas valve, said gas valve adapted for closing said gas outlet when said float rises above a given high level;
      d) said shaft having a bottom end with a liquid valve adapted to close the liquid outlet when said float falls to a given low level;
      e) a particle agitator for dislodging particulate matter accumulated in the liquid outlet of said body;
      f) one or more vanes located in a swirling path of liquids in said cyclone separator, said one or more vanes adapted for rotating said particle agitator; and
   whereby gasses are dynamically separated from liquids in said cyclone separator.

18. The cyclone separator of claim 1, wherein the fluid valve comprises a stopper.

19. The cyclone separator of claim 1, wherein the fluid valve comprises a sleeve valve.

20. The cyclone separator of claims 1 or 8, wherein the gas valve comprises a stopper.

21. The cyclone separator of claims 1 or 8, wherein the gas valve comprises a sleeve valve.

22. The cyclone separator of claim 1, wherein the fluid valve is rotatably connected to a shaft which joins the valve to the float.

23. The cyclone separator of claims 1 or 8, wherein the gas valve is rotatably connected to a shaft which joins the valve to the float.

24. A method of operating a cyclone separator for separating liquids from gases, comprising;
   swirling a gaseous liquid within said cyclone separator to separate gases from liquids;
   allowing the gases to exit said cyclone separator at a top gas outlet thereof and allowing liquids to exit said cyclone separator at a bottom liquid outlet thereof;
   using a float on the separated liquid to move up and down with a level of the separated liquid;
   closing the liquid outlet of the cyclone separator when the float moves down with a lower liquid level, and closing the gas outlet of the cyclone separator when the float moves up with an upper liquid level;
   rotating a particle dislodger located in a bottom of the cyclone separator to dislodge particulate matter accumulated in the bottom of said cyclone separator; and
   using swirling liquids in said cyclone separator to rotate the particle dislodger.

25. The method of claim 24, further including moving a spike up and down in the liquid outlet to dislodge accumulated particles therein.

26. The method of claim 24, further including moving a piercing spike up and down in the liquid outlet to dislodge particles therein.

27. The method of claim 24, further including rotating a fluted member in the liquid outlet to dislodge particulate matter accumulated in the liquid outlet.

28. The method of claim 24, further including rotating an auger to dislodge particulate matter accumulated in the liquid outlet.

29. The method of claim 24, further including rotating an agitator with said float for agitating liquids in the bottom portion of said cyclone separator.

* * * * *